Patented Sept. 6, 1927.

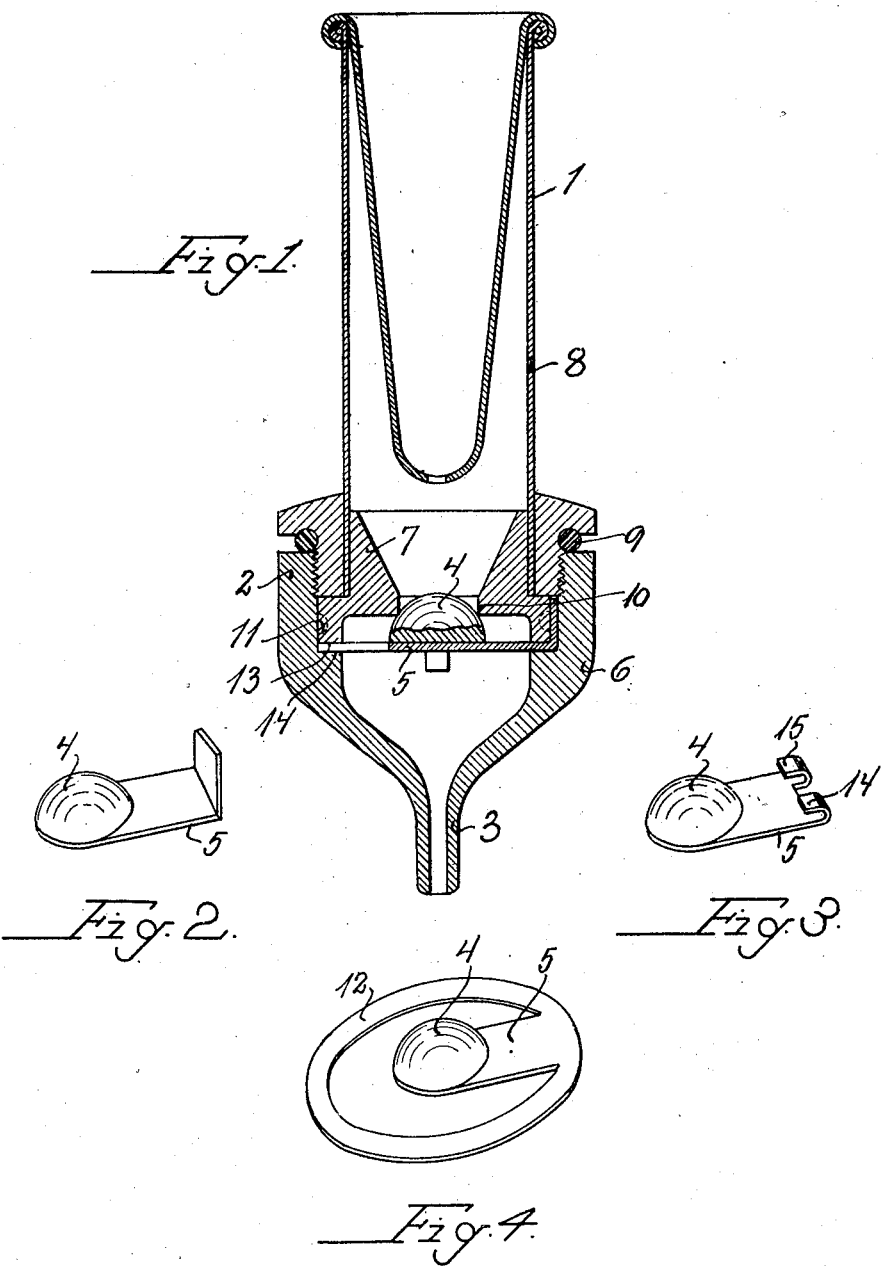

1,641,316

UNITED STATES PATENT OFFICE.

OTTO BRUUN, OF FREDERIKSBERG, NEAR COPENHAGEN, DENMARK.

MILKING CUP.

Application filed June 27, 1927, Serial No. 201,817, and in Denmark June 2, 1926.

In suction milking by means of milking machines it is known to use milking cups adapted to be pushed over the teats of the cow, each of the said cups communicating at the bottom with a valve chamber containing a valve which is exposed to the action of a vacuum created in the valve chamber and thereby is given a reciprocating motion which effects the milking.

One condition for a satisfactory milking operation being performed during the course of a reasonable time is that the motion of the said valve shall alternately create and release the vacuum about the teat.

In order to be able to do this the valve must alternately close and open the connection between the interior of the milking cup and the interior of the valve chamber communicating with the suction line.

With only one single exception the heretofore used valves have not been able to fill this condition. The valves have heretofore either become clogged in closed position or have been unable to close the connection between the milking cup and the valve chamber, or in cases where the valve has been able to perform the above described function it has been constructed in such a manner that during the first stage of the suction it maintains the connection open between the milking cup and the valve chamber, and does not move up and break this connection until a certain vacuum has been established in the valve chamber as well as in the milking cup and in the valve proper which is constructed as a hollow body. In the case of these known reduction valves the valve is formed partly of rubber, the cavity in the valve being closed by a rubber diaphragm which, during the suction in the valve chamber, moves forward and closes the connection between the valve chamber and the milking cup, and recedes again after the vacuum in the milking cup has been equalized by supply of air from the outside. A vacuum produced in the interior of the valve and maintained during the milking will then suck the diaphragm back from the said closing position, whereafter the connection between the milking cup and the valve chamber is maintained open until the vacuum produced by the suction there becomes greater than the vacuum in the interior of the valve, whereafter the rubber diaphragm once more closes the connection between the milking cup and the valve chamber, etc. Hence, the distinguishing feature of this known reduction valve is that the pressure variation in the milking cup produced by the motion of the said valve and required in order to effect the milking is produced by first creating a vacuum simultaneously in the valve chamber and the milking cup, whereafter the latter is disconnected from the valve chamber and its vacuum is equalized.

This device requires the use of a particularly complicated valve composed of metallic parts and rubber parts, which valve is extremely difficult to keep clean, and requires a relatively high vacuum (about 450 mm.) and large air pumps, because a considerable quantity of air flows through the milking cup, which latter if, left without cleaning after the milking, will easily become covered with a slimy and repulsive coating, apparently in consequence of the action of the milk on the rubber.

The present invention has for its object to produce a reduction valve for suction milking machinery containing no rubber parts nor requiring such for effecting the desired periodical obstruction between the valve chamber and the milking cup. In order to attain this result the valve according to the present invention is constructed of metal or like hard material having a seating surface forming a part of a spherical face; for instance, the valve may be in the shape of a spherical or hemispherical body attached to a flat spring and maintained pressed against its seat in the valve chamber by the said spring, in such a manner that the said valve, in contradistinction to other reduction valves for similar use, will maintain the interior of the milking cup closed from the interior of the valve chamber when the milking cup is not in use. Hereby quite considerable advantages are attained. Such valve device will for instance be able to work with a lower vacuum than the heretofore known reduction valves for suction milking, as by a suitable construction of the plate spring it will be able to operate at a vacuum of about 350 mm., and at the same time the quantity of air to be sucked through the milking cup will be considerably smaller than in the heretofore known arrangements. Without special precautions having to be taken to prevent excessive supply of air to the suction pump concerned by way of the milking cup, the latter, when fitted with a valve device of the nature here specified, may be detached from the udder of one cow and removed to the udder of another cow, as the valve will prevent any excessive introduction of air by way of the detached milking cup, because the said valve will normally maintain the interior of the milking cup disconnected from the valve chamber.

A valve of the said nature differs thus from the previously known valves in that the alternate creation of vacuum and release of the same in the milking cup is effected by first creating the necessary vacuum in the valve chamber, whereupon the valve opens by itself and distributes the vacuum over the milking cup and the valve chamber thereafter the valve closes again, the vacuum in the milking cup is equalized in known manner, and the valve is opened again, etc. It is not necessary that a valve of this nature should fit absolutely tightly against its seat. Immediately a vacuum is created in the valve chamber a suction effect will be generated in the milking cup in case the valve seat does not fit tightly against the valve body, and thereby a small quantity of milk will be sucked from the teat and flow downward over the valve where it will become lodged along the periphery of the seat of the latter and form an air-tight joint.

In the accompanying drawing:

Fig. 1 shows a longitudinal section of one construction of the invention, and

Figs. 2, 3 and 4 show three different embodiments of a supporting member for the valve.

1 is a milking cup to the bottom end of which there is attached a cap 2 providing an internal air chamber, which cap by means of a nipple 3, may be connected to a suction pipe and contains a valve body or valve proper 4 having a hemispherical face. The valve 4 is attached to the end of a plate spring 5, and the other end of the latter, as shown in Figs. 1 and 2, is held firmly between a shoulder 6 on the wall of the valve chamber and a throat-piece 7 inserted in the latter and forming a seat for the valve 4. The valve 4 is made of metal, and is kept pressed down against its seat 10 in the throat 7 by means of the spring 5.

The apparatus here described acts in the following manner:

The creation of a vacuum in the valve chamber by suction through the nipple 3 will cause a difference in the pressures in the milking cup 1 and in the interior of the valve chamber. When this pressure difference has reached a certain magnitude, it will pull valve 4 downward. Hereby the said pressure difference will become equalized, however, and the spring 5 will therefore press the valve back against its seat 10, whereby a new pressure difference will be created which causes the valve to open again, and in this manner the valve will be set into a vibratory motion during which the milking operation is performed. Whenever the valve opens a vacuum is produced in the cup 1 whereby milk will be sucked out from the teat inserted into the same. The vacuum in the milking cup, however, is equalized before and during the subsequent closure of the valve 4 by air flowing into the milking cup by way of a fine hole 8 in the latter.

A valve of the above described kind is exceedingly easy to take apart and to clean, as it consists merely of metallic parts with the exception of a packing 9 by means of which the valve chamber 2 is joined tightly to the cup 1. This packing, however, is not in contact with the milk flowing through the cup.

According to Fig. 3 the valve body supporting spring 5 terminates in two hooks 15 adapted to be received in an annular groove 11, which for said purpose may be provided in the throat 7, as shown with dotted lines in Fig. 1.

According to Fig. 4 the valve spring 5 forms an integral part of a ring 12 adapted to be held firmly between the annular bottom face 13 of the throat 7 and the annular face 14 of the shoulder 6.

Having now particularly described and ascertained the nature of my said invention and in what manner the same is to be performed, I declare that what I claim is:—

1. A device of the character described comprising a milking cup adapted to receive a teat, a cap attached to one end of the milking cup and providing an internal valve chamber having a suction aperture, a valve seat in said chamber, a plate spring one end of which projects freely into the valve chamber, and a valve attached to the said free end of the plate spring and having a hemispherical seating surface adapted to be held against said valve seat by the action of the plate spring and to be removed from the same against the spring action by suction effect in the valve chamber.

2. A device of the character described comprising a milking cup adapted to receive a teat, a cap attached to one end of the milking cup and providing an internal valve chamber having a suction aperture, a valve seat in said chamber, a plate spring having one end securely clamped in the valve chamber and having the other end projecting freely into said chamber beneath the valve seat, and a valve attached to the said free end of the plate spring and having a hemispherical seating surface adapted to be held against said valve seat by the action of the plate spring and to be removed from the same against the spring action by suction effect in the valve chamber.

In testimony whereof I affix my signature.

OTTO BRUUN.